(12) United States Patent
Suzuki

(10) Patent No.: US 7,362,511 B2
(45) Date of Patent: Apr. 22, 2008

(54) ZOOM LENS SYSTEM FOR MICROSCOPE AND MICROSCOPE USING THE SAME

(75) Inventor: Fumio Suzuki, Yokohama (JP)

(73) Assignee: Nikon Corporation, Tokyo (JP)

( * ) Notice: Subject to any disclaimer, the term of this patent is extended or adjusted under 35 U.S.C. 154(b) by 579 days.

(21) Appl. No.: 10/860,583

(22) Filed: Jun. 4, 2004

(65) Prior Publication Data
US 2004/0246592 A1 Dec. 9, 2004

(30) Foreign Application Priority Data
Jun. 6, 2003 (JP) ............................. 2003-161739

(51) Int. Cl.
*G02B 15/14* (2006.01)
(52) U.S. Cl. ....................... 359/687; 359/380; 359/676
(58) Field of Classification Search ..................... None
See application file for complete search history.

(56) References Cited

U.S. PATENT DOCUMENTS 5,959,772 A 9/1999 Yonezawa ................... 359/434

6,961,188 B2* 11/2005 Betensky et al. ........... 359/676

FOREIGN PATENT DOCUMENTS

JP 9-274137 10/1997
JP 3318014 6/2002

* cited by examiner

*Primary Examiner*—Stephone B. Allen
*Assistant Examiner*—Derek S. Chapel
(74) *Attorney, Agent, or Firm*—Miles & Stockbridge, P.C.

(57) ABSTRACT

A zoom lens system for a microscope includes, in the following order from the object side, a first lens group having a positive refractive power, a second lens group having a negative refractive power, a third lens group having a positive refractive power, and a fourth lens group having a positive refractive power. Magnification of the zoom lens system is varied by moving the second lens group and the third lens group. The zoom lens system has an entrance pupil on the object side of the first lens group, and the following conditions are satisfied:

$-1.3 < \beta 2H < -0.7$ $-0.1 < 1/\beta 3L < 0$ where $\beta 2H$ is the magnification of the second lens group in the highest magnification state, and $\beta 3L$ is the magnification of the third lens group in the lowest magnification state.

10 Claims, 17 Drawing Sheets

ZOOM LENS SYSTEM FOR MICROSCOPE AND MICROSCOPE USING THE SAME

This application claims the benefit of Japanese Patent application No. 2003-161739 which is hereby incorporated by reference.

BACKGROUND OF THE INVENTION

1. Field of the Invention

The present invention relates to a zoom lens system for a microscope and a microscope using that zoom lens system. More particularly, the present invention relates to a zoom lens system that is to be applied to an infinity correction type microscope and forms an image directly on an image pickup element, such as a CCD, without forming an intermediate image, and a microscope using that zoom lens system.

2. Related Background Art

Conventionally, there has been used microscope zoom lens systems using a relay lens system in which an intermediate image is formed by an imaging lens utilizing a light flux from an objective lens and the magnification of the intermediate image is varied by a relay lens having a zoom function (see, for example, Japanese Patent Application Laid-Open No. 9-274137).

However, in the aforementioned microscope zoom lens system using a relay lens system, an intermediate image is once formed by an imaging lens and then the intermediate image is relayed by a zoom relay lens onto an image pickup element. This results in the problem that the optical system becomes long and when the system is built in a microscope, the size of the microscope apparatus becomes large. In addition, since it is necessary to provide a positive field lens for relaying a pupil position to a position in the vicinity of the intermediate image, the Petzval sum of the optical system as a whole becomes positive and large and a negative curvature of field is generated, which is undesirable.

SUMMARY OF THE INVENTION

The present invention has been made in view of the above-described problems. An object of the present invention is to provide a zoom lens system for a microscope that is compact in size and having favorable optical performance and a microscope using that zoom lens system.

According to the present invention that is intended to solve the above-described problem, there is provided a zoom lens system for an microscope comprising, in the following order from the object side, a first lens group having a positive refractive power, a second lens group having a negative refractive power, a third lens group having a positive refractive power, and a fourth lens group having a positive refractive power, wherein the magnification of the zoom lens system is varied by moving the second lens group and the third lens group, the zoom lens system has an entrance pupil on the object side of the first lens group, and satisfies the following conditions:

$$-1.3 < \beta 2H < -0.7$$

$$-0.1 < 1/\beta 3L < 0$$

where $\beta 2H$ is the magnification of the second lens group in the highest magnification state, and $\beta 3L$ is the magnification of the third lens group in the lowest magnification state.

In the zoom lens system for an microscope according the present invention, it is preferable that the following condition be satisfied:

$$0.5 < PL/fL < 1.2$$

where PL is the distance between the position of the entrance pupil and the object side surface of the first lens group G1, and fL is the focal length of the zoom lens system for a microscope as a whole in the lowest magnification state.

In the zoom lens system for a microscope according the present invention, it is preferable that the first lens group include a front lens group having a positive refractive power and a rear lens group having a weak negative refractive power, the front lens group and the rear lens group being spaced apart by a long lens distance, and the following condition is satisfied:

$$0.15 < L1/f1 < 0.35$$

where f1 is the focal length of the first lens group, and L1 is the lens distance, which is optical path length, between the front lens group G1F and the rear lens group G1R.

A microscope according to the present invention comprises, in the following order from the object side, an objective lens system, any one of the above-described zoom lens system for an microscope, and image pickup means, wherein the position of an exit pupil of the objective lens system is arranged at the position same as or in the vicinity of the position of the entrance pupil of the zoom lens system for a microscope.

In the microscope according to the present invention, it is preferable that optical path separating means for separating an optical path of the zoom lens system for a microscope and an optical path of an optical system for visual observation be provided in the long lens distance between the front lens group and the rear lens group.

A microscope according to the present invention comprises, in the following order from the object side, an objective optical system for guiding light from an object to be observed to a zoom lens system, a zoom lens system for guiding light from the objective lens and making an image of the object to be observed at a desired magnification, and image pickup means for picking up said image of the object to be observed, wherein the zoom lens system focuses light from the objective lens system directly on an image pickup surface of the image pickup means without forming an intermediate image.

DESCRIPTION OF THE PREFERRED EMBODIMENTS

Figure 1:
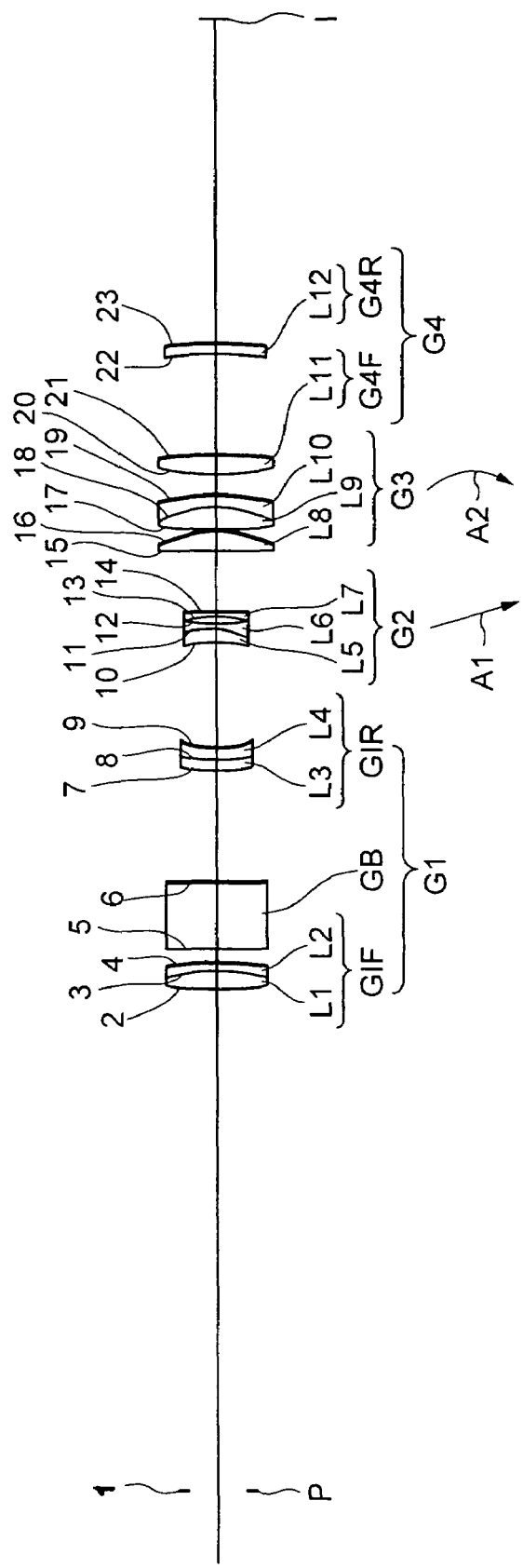
FIG. 1 is a diagram showing the lens configuration of a first example of a microscope zoom lens system according to the present invention.

In the following, preferred embodiments of the present invention will be described with reference to the accompanying drawings. A microscope zoom lens system (i.e. a zoom lens system for a microscope) according to the present invention includes, in the following order from the object side, a first lens group G1 having a positive refractive power, a second lens group G2 having a negative refractive power, a third lens group G3 having a positive refractive power and a fourth lens group G4 having a positive refractive power. The second lens group G2 and the third lens group G3 are adapted to be moved as the respective groups along the optical axis direction to change magnification while correcting variations in the image plane position caused by the change in the magnification. While the magnification changing process, both the first lens group G1 and the fourth lens group G4 are fixed with respect to the image plane. The microscope zoom lens system according to the present invention has an entrance pupil on the object side of the first lens group G1.

In order to attain an object of the present invention, namely to realize a microscope zoom lens system that is compact in size and having favorable performance, for imaging a light flux from an objective lens directly onto an image pickup element such as a CCD, it is preferable that the following conditions (1) and (2) be met:

$$-1.3 < \beta 2H < -0.7 \tag{1}$$

$$-0.1 < 1/\beta 3L < 0 \tag{2}$$

where β2H represents the magnification of the second lens group G2 in the highest magnification state, and β3L represents the magnification of the third lens group G3 in the lowest magnification state.

The above condition (1) is the condition for attaining downsizing of the microscope zoom lens system, especially downsizing of the third lens group G3. If the value becomes smaller than the lower limit of condition (1), the shift amount of the second lens group G2 becomes large. This is undesirable because a large and complicated mechanism is required for shifting the second lens group G2 and the third lens group G3. However, if reduction of the shift amount of the second lens group G2 is to be attained under the same condition, it is necessary to increase the refractive power of the second lens group G2. This invites a difficulty in aberration correction in the peripheral area of the field. On the other hand, if the value becomes larger than the upper limit of condition (1), the distance between the second lens group G2 and the third lens group G3 becomes large in the lower magnification range. As a result, the incidence height of the marginal light fluxes incident on the third lens group G3 becomes high. This is undesirable because this means that the size of the third lens group G3 becomes large.

The aforementioned condition (2) is a condition for attaining an excellent optical performance in the peripheral area of the field in the lower magnification range and downsizing of the microscope zoom lens system, especially, downsizing of the fourth lens group G4. If the value becomes smaller than the lower limit of condition (2), the refractive power of the third lens group G3 becomes large, and it is difficult to correct aberrations in the peripheral area of the field in the lower magnification range. On the other hand, if the value becomes larger than the upper limit of condition (2), the refractive power of the third lens group G3 becomes small and the incidence height of the marginal light fluxes incident on the fourth lens group G4 becomes high. This is undesirable because this means that the size of the fourth lens group G4 becomes large.

In the present invention, it is preferable that the following condition (3) be met:

$$0.5 < PL/fL < 1.2 \tag{3}$$

where PL represents the distance between the entrance pupil position and the object side surface of the first lens group G1, and fL represents the focal length of the zoom lens system for a microscope as a whole in the lowest magnification state.

The above condition (3) is a condition for optimizing the entrance pupil position of the microscope zoom lens system according to the present invention to attain excellent optical performance in the peripheral area of the field and to optimize a microscope system equipped with this microscope zoom lens system. If the vale becomes smaller than the lower limit of condition (3), the distance between the objective lens system and the microscope zoom lens system becomes too small and it is not possible to provide a space for inserting an epi-illumination apparatus etc. in the optical path between the objective lens and the microscope zoom lens system. This is undesirable because use of a microscope system equipped with the microscope zoom lens system according to the present invention is restricted to a large degree. On the other hand, if the value becomes larger than the upper limit of condition (3), the incidence height of the marginal light fluxes incident on the third lens group G3 and the fourth lens group G4 becomes high. This is undesirable because this means the size of the third lens group G3 and the fourth lens group G4 becomes large.

Furthermore, in the present invention, it is preferable that the first lens group G1 include a front lens group G1F having a positive refractive power and a rear lens group G1R having a weak negative refractive power, the front lens group G1F and the rear lens group G1R be spaced apart by a considerable distance, and the following condition (4) be met:

$$0.15 < L1/f1 < 0.35 \tag{4}$$

where f1 represents the focal length of the first lens group G1, and L1 represents the lens distance (optical path length) between the front lens group G1F and the rear lens group G1R.

The above condition (4) is a condition for optimizing a microscope system equipped with the microscope zoom lens system according to the present invention and for attaining downsizing of the microscope zoom lens system, especially downsizing of the first lens group G1. If the value becomes smaller than the lower limit of condition (4), it is not possible to provide a space in which optical path separating means (e.g. a half prism or a switching mirror) for separating and switching an optical path for the microscope zoom lens system according to the present invention and an optical path for a barrel for visual observation is inserted between the front lens group G1F and the rear lens group G1R. This is undesirable because use of a microscope system equipped with the microscope zoom lens system according to the present invention is restricted to a large degree. On the other hand, it is not desirable that the value become larger than the upper limit of condition (4), since the size of the first lens group G1 becomes large.

A microscope according to the present invention is provided with an objective lens system, a microscope zoom lens system having the above-described structure and image pickup means, in the mentioned order from the object side, and arranged in such a way that the exit pupil position of the objective lens system is at the position same as or in the vicinity of the entrance pupil position of the microscope zoom lens system.

With the above arrangement, in the microscope according to the present invention, positional relationship of the objective lens system and the microscope zoom lens system is optimized, so that excellent performance in the peripheral area of the field is realized and a space for inserting an epi-illumination apparatus etc. in the optical path can be provided. In addition, in the present invention, it is possible to realize a microscope equipped with the above-described microscope zoom lens system in which image information from the image pickup means such as a solid state image pickup element or the like is displayed on display means such as a liquid crystal display device or the like, so that a microscope image can be observed without using an eyepiece lens and continuous magnification variation of the electronic image and image pickup can be easily carried out.

In the microscope according to the present invention, it is preferable that optical path separating means for separating an optical path for the microscope zoom lens system according to the present invention and an optical path for a barrel for visual observation be provided in the large space between the front lens group G1F and the rear lens group G1R.

With the above-described arrangement, the present invention can realize a microscope equipped with the above-described microscope zoom lens system in which observation using an eyepiece lens and observation or image pickup based on an electronic image using the microscope zoom lens system can be easily changed over.

EXAMPLES

In the following, examples of the present invention will be described with reference to the accompanying drawings. In the first to fifth examples, the microscope zoom lens system according to the present invention includes, in the following order from the object side, a first lens group G1 having a positive refractive power, a second lens group G2 having a negative refractive power, a third lens group G3 having a positive refractive power and a fourth lens group G4 having a positive refractive power. The first lens group G1 includes a front first lens group G1F having a positive refractive power and a rear first lens group G1R having a weak negative refractive power, which are spaced apart from each other by a considerable lens distance. The fourth lens group G4 includes a front fourth lens group G4F having a positive refractive power and a rear fourth lens group G4R having a negative refractive power. In addition, an objective lens is disposed between a specimen (not shown) and this optical system. The position of the exit pupil of the objective lens system coincides with the entrance pupil position P of the microscope zoom lens system according to the present invention.

In the arrangement of the present invention as described above, the second lens group G2 and the third lens group G3 are moved along the optical axis direction to change the magnification. During the magnification changing process, the first lens group G1 and the fourth lens group G4 are fixed relative to the image plane I.

First Example

In the following, the first example of the present invention will be described with reference to FIGS. 1 to 4. FIG. 1 is a diagram showing the lens configuration of the first example of the microscope zoom lens system according to the present invention. In the first example of the microscope zoom lens system, the first lens group G1 includes, in the following order from the object side, a front first lens group G1F in the form of a cemented lens composed of a biconvex lens L1 and a negative meniscus lens L2 with the concave surface facing the object side, a glass block GB, and a rear first lens group G1R in the form of a cemented lens composed of a positive meniscus lens L3 with the convex surface facing the object side and a negative meniscus lens L4 with the convex surface facing the object side. The second lens group G2 includes, in the following order from the object side, a cemented lens composed of a positive meniscus lens L5 with the concave surface facing the object side and a biconcave lens L6, and a negative meniscus lens L7 with the concave surface facing the object side. The third lens group G3 includes, in the following order from the object side, a positive meniscus lens L8 with the concave surface facing the object side and a cemented lens composed of a biconvex lens L9 and a negative meniscus lens L10 with the concave surface facing the object side. The fourth lens group G4 includes, in the following order from the object side, a front fourth lens group G4F in the form of a biconvex lens L11, and a rear fourth lens group G4R in the form of a negative meniscus lens L12 with the concave surface facing the object side.

In the present invention, when the magnification is varied from the lowest magnification (1pos) to the highest magnification (3pos) through an intermediate magnification state (2pos), the second lens group G2 is moved toward the image side (as shown by arrow A1). In addition, the third lens group G3 is moved (as shown by arrow A2) in such a way as to compensate displacement of the focal point caused by the movement of the second lens group G2. During the magnification changing process, both the first lens group G1 and the fourth lens group G4 are fixed relative to the image plane I.

The entrance pupil is arranged at a position spaced apart by 150 mm from the surface in the first lens group G1 that is closest to the object in the frontward direction. The diameter of the entrance pupil is φ16 mm.

Various values associated with the first example are listed in Table 1. In Table 1, m in the first column refers to the optical surface number (which will be hereinafter referred to as the surface number) counted from the object side, r in the second column refers to the radius of curvature of each optical surface, d in the third column refers to the distance on the optical axis from each optical surface to the next optical surface (or the image plane), ν in the fourth column refers to the Abbe's number, and nd in the fifth column refers to the refractive index for the d-line (587 nm). In addition, f represents the focal length of the lens system as a whole under the condition that the object point is at infinity, Fno represents the F-number and P represents the entrance pupil.

In Table 1, the focal length f of the whole lens system and the surface distances that vary with the zooming operation, are also presented for the lowest magnification state (1pos), the intermediate magnification state (2pos) and the highest magnification state (3pos). In addition, the values corresponding to conditions (1) to (4) are also presented in Table 1. The above descriptions concerning to Table 1 also apply to the tables that will be presented in connection with the other examples.

It should be noted that in the first example, surface number 1 denotes the entrance pupil P. It also should be noted that surface distance d9 (i.e. the surface distance between surface number 9 and surface number 10) presented in connection with surface number 9, surface distance d14 (i.e. the surface distance between surface number 14 and surface number 15) presented in connection with surface number 14 and surface distance d19 (i.e. the surface distance between surface number 19 and surface number 20) presented in connection with surface number 19 vary with the zooming operation.

TABLE 1 f = 160-400
Fno = 10.0-25.0

| m | r | d | ν | nd |
|---|---|---|---|---|
| 1 | entrance pupil P | 150.0000 | | 1.000000 |
| 2 | 144.0410 | 5.0000 | 71.31 | 1.569070 |
| 3 | −75.9140 | 2.0000 | 35.19 | 1.749501 |
| 4 | −160.0210 | 4.0000 | | 1.000000 |
| 5 | ∞ | 20.0000 | 56.05 | 1.568829 |
| 6 | ∞ | 34.0000 | | 1.000000 |
| 7 | 36.7780 | 4.0000 | 51.47 | 1.733997 |
| 8 | 79.9030 | 3.0000 | 47.23 | 1.670029 |
| 9 | 29.2280 | d9 (variable) | | 1.000000 |
| 10 | −77.8680 | 4.0000 | 23.78 | 1.846660 |
| 11 | −21.1960 | 1.6000 | 49.60 | 1.772499 |
| 12 | 92.0030 | 1.6000 | | 1.000000 |
| 13 | −43.7840 | 1.6000 | 49.60 | 1.772499 |
| 14 | −681.8700 | d14 (variable) | | 1.000000 |
| 15 | −539.3400 | 5.5000 | 82.52 | 1.497820 |
| 16 | −44.6950 | 0.5000 | | 1.000000 |
| 17 | 227.1390 | 6.5000 | 82.52 | 1.497820 |
| 18 | −44.4750 | 3.0000 | 28.54 | 1.795040 |
| 19 | −101.8260 | d19 (variable) | | 1.000000 |
| 20 | 80.7720 | 5.5000 | 82.52 | 1.497820 |
| 21 | −416.0040 | 30.0000 | | 1.000000 |
| 22 | −200.0490 | 3.0000 | 61.40 | 1.516800 |
| 23 | −738.1500 | 107.8959 | | 1.000000 |

(Variable Distance Upon Magnification Variation)

| | lowest (1 pos) | intermediate (2 pos) | highest (3 pos) |
|---|---|---|---|
| f | 160.00000 | 250.00000 | 400.00000 |
| d9 | 7.93665 | 32.04363 | 47.62620 |

TABLE 1-continued f = 160-400
Fno = 10.0-25.0

| | | | |
|---|---|---|---|
| d14 | 26.99758 | 19.05768 | 5.96350 |
| d19 | 23.06375 | 6.89668 | 4.40828 |

(Values corresponding to Conditions)

(1) $\beta 2H = -1.161$
(2) $1/\beta 3L = -0.057$
(3) PL/fL = 0.938
(4) L1/f1 = 0.282

Figure 2:
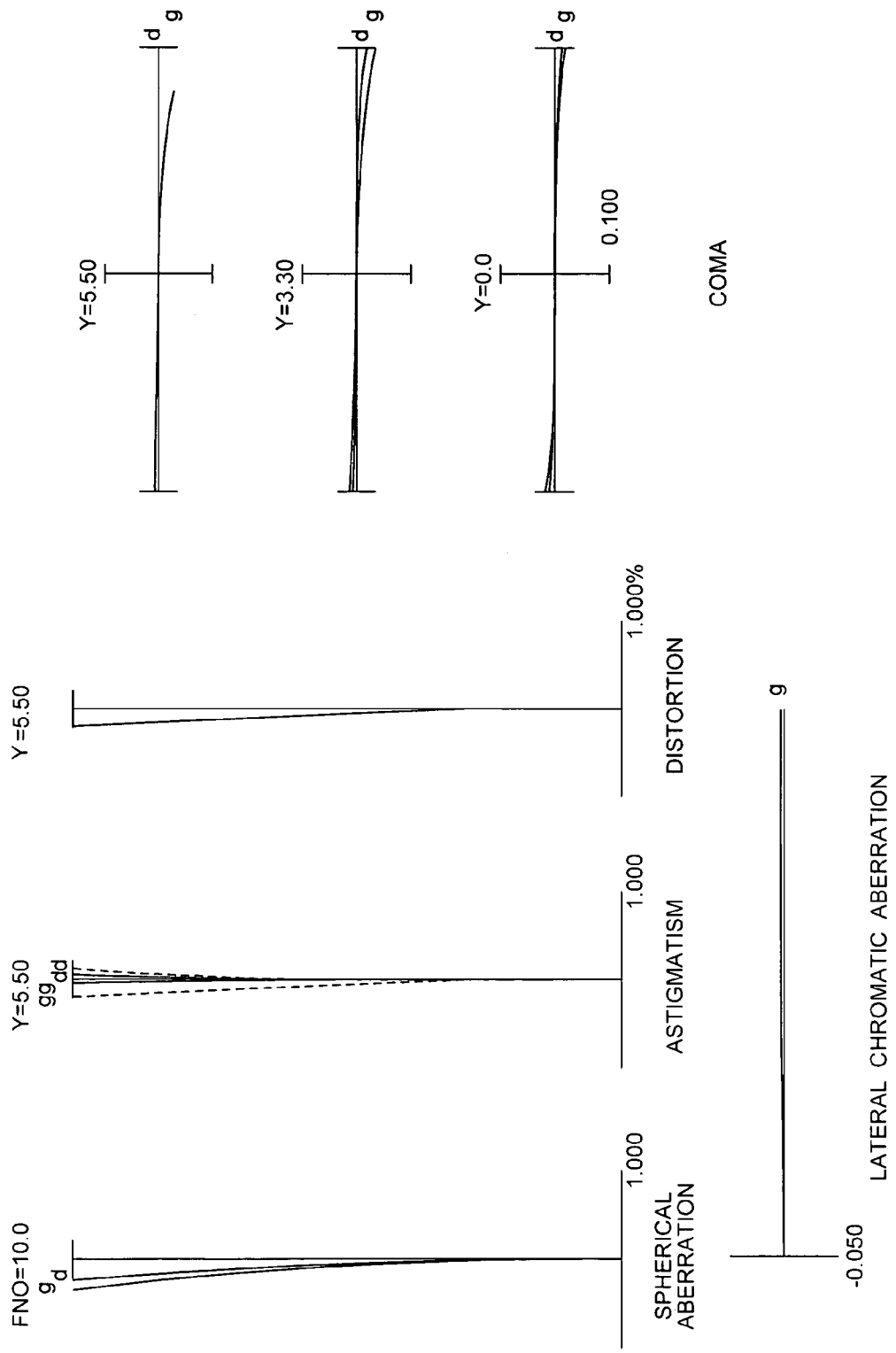
FIG. 2 shows aberrations of the first example at the lowest magnification (1pos).
Figure 3:
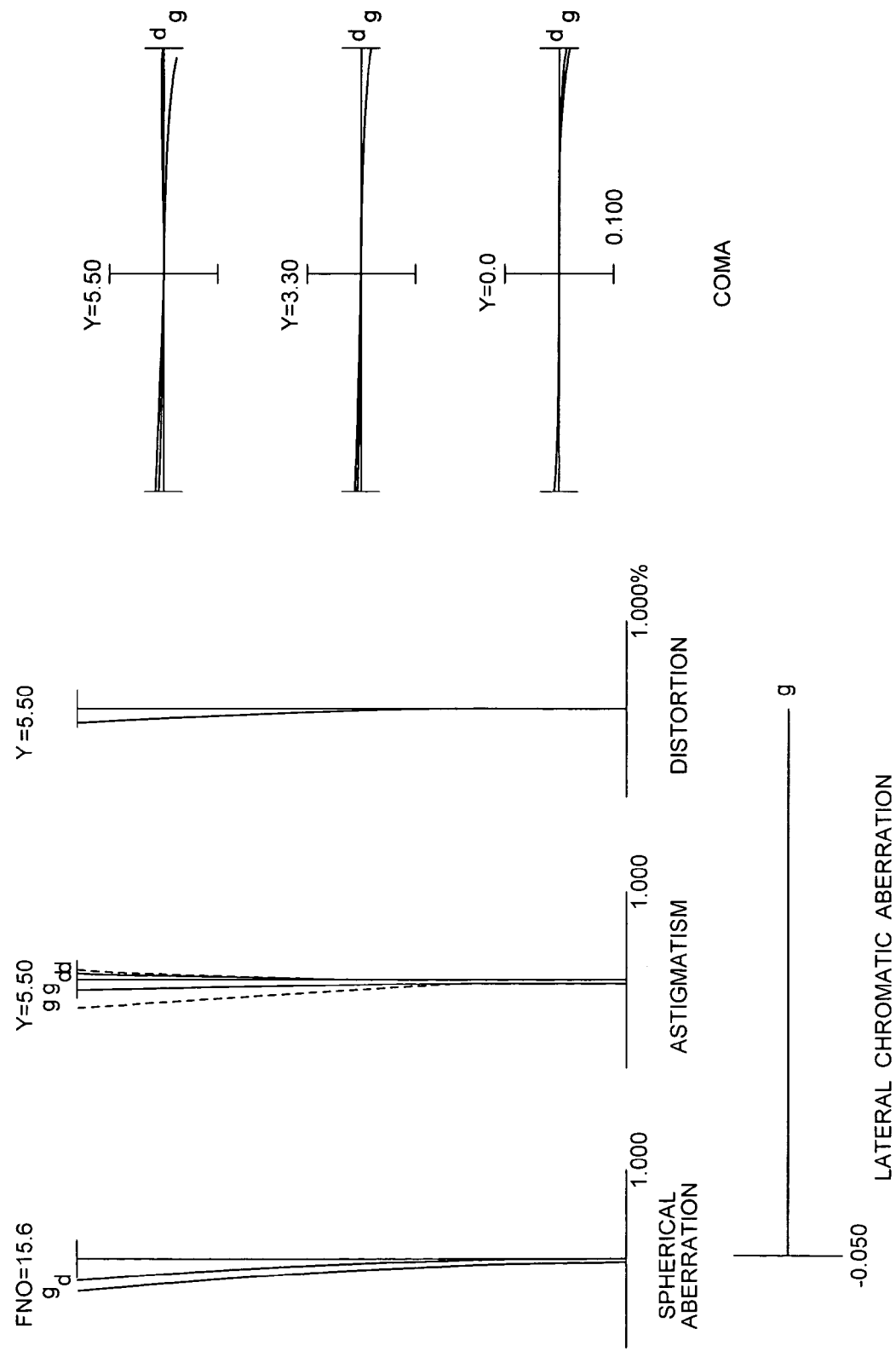
FIG. 3 shows aberrations of the first example at an intermediate magnification state (2pos).
Figure 4:
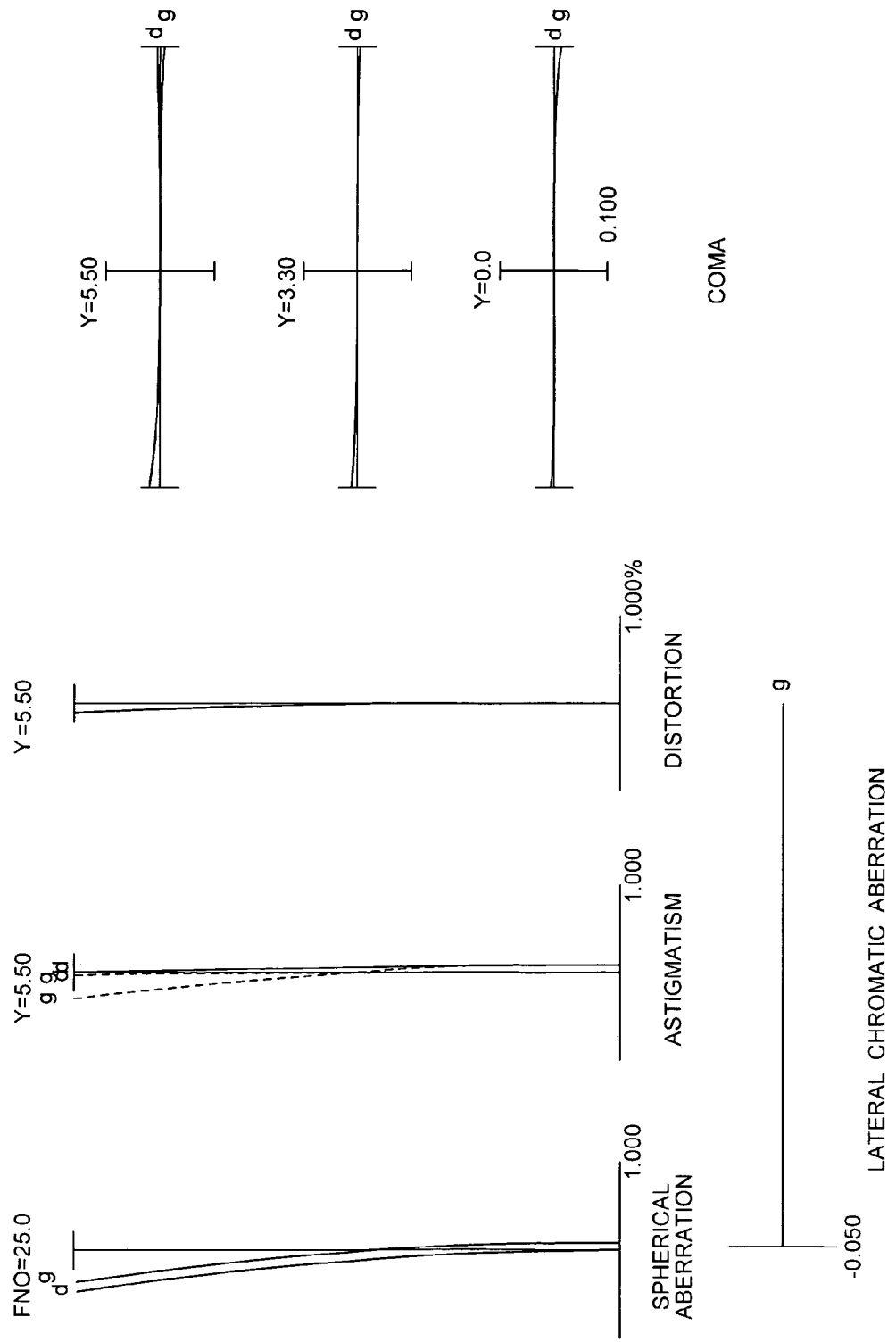
FIG. 4 shows aberrations of the first example at the highest magnification (3pos).

As per the above, the first example satisfies all of the aforementioned conditions (1) to (4). FIGS. 2 to 4 show spherical aberration, astigmatism, distortion, coma and lateral chromatic aberration the first example. Specifically, FIG. 2 shows aberrations at the lowest magnification (f=160), FIG. 3 shows aberrations at the intermediate magnification state (f=250) and FIG. 4 shows aberrations at the highest magnification (f=400). In the aberration diagrams, Fno represents the F-number, d represents the d-line ($\lambda$=587 nm) and g represents the g-line ($\lambda$=436 nm). In the spherical aberration diagrams, the F-number corresponding to the maximum diameter is inserted. In the astigmatism diagrams and the distortion diagrams, the maximum image height is inserted. In the coma diagrams, the respective image heights are inserted. In the astigmatism diagrams, the solid lines designate the sagittal image surface and the broken lines designate the meridional image surface. The above descriptions of the aberration diagrams also apply to the other examples.

As will be apparently appreciated from the aberration diagrams, in the first example, the aberrations are favorably corrected in each of the focal length states and excellent imaging performance is ensured.

Second Example

Figure 5:
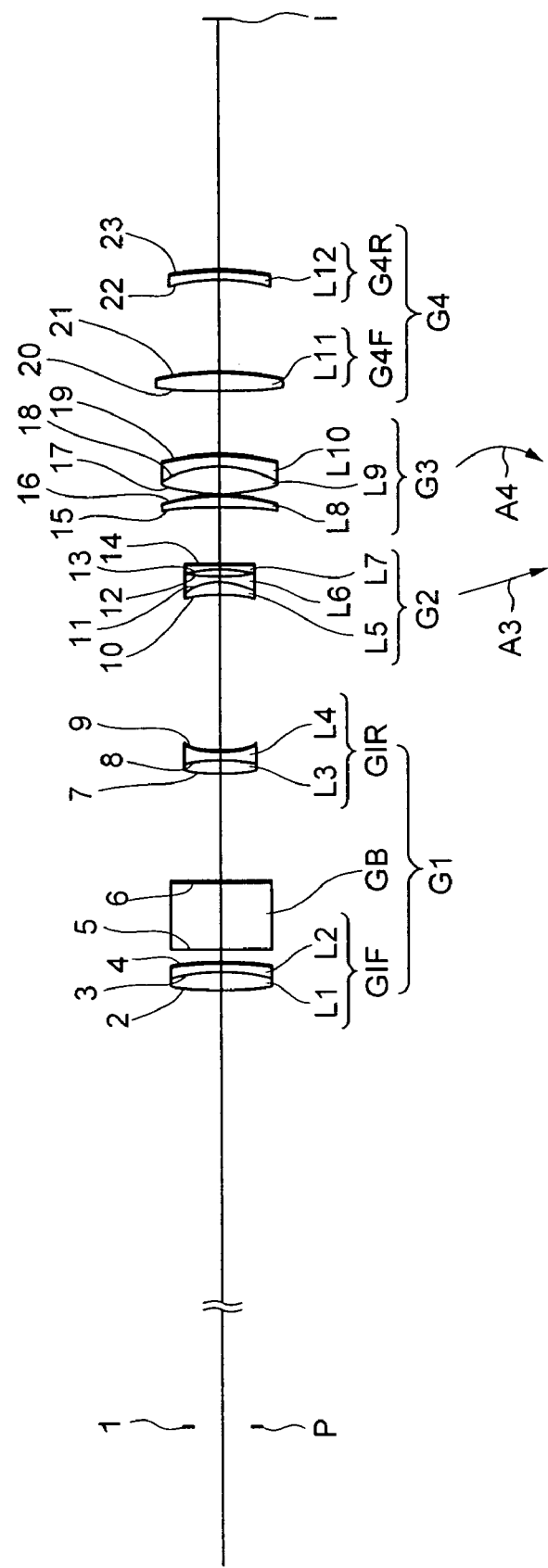
FIG. 5 is a diagram showing the lens configuration of a second example of a microscope zoom lens system according to the present invention.

Next, the second example of the present invention will be described with reference to FIGS. 5 to 8. FIG. 5 is a diagram showing the lens configuration of the second example of the microscope zoom lens system according to the present invention. In the second example of the microscope zoom lens system, the first lens group G1 includes, in the following order from the object side, a front first lens group G1F in the form of a cemented lens composed of a biconvex lens L1 and a negative meniscus lens L2 with the concave surface facing the object side, a glass block GB, and a rear first lens group G1R in the form of a cemented lens composed of a biconvex lens L3 and a biconcave lens L4. The second lens group G2 includes, in the following order from the object side, a cemented lens composed of a positive meniscus lens L5 with the concave surface facing the object side and a biconcave lens L6, and a biconcave lens L7. The third lens group G3 includes, in the following order from the object side, a positive meniscus lens L8 with the concave surface facing the object side and a cemented lens composed of a biconvex lens L9 and a negative meniscus lens L10 with the concave surface facing the object side. The fourth lens group G4 includes, in the following order from the object side, a front fourth lens group G4F in the form of a biconvex lens L11, and a rear fourth lens group G4R in the form of a negative meniscus lens L12 with the concave surface facing the object side.

In the present invention, when the magnification is varied from the lowest magnification (1pos) to the highest magnification (3pos) through an intermediate magnification state (2pos), the second lens group G2 is moved toward the image side (as shown by arrow A3). In addition, the third lens group G3 is moved (as shown by arrow A4) in such a way as to compensate displacement of the focal point caused by the movement of the second lens group. During the magnification changing process, both the first lens group G1 and the fourth lens group G4 are fixed relative to the image plane I.

The entrance pupil is arranged at a position spaced apart from the surface in the first lens group G1 that is closest to the object by 150 mm in the frontward direction. The diameter of the entrance pupil is φ16 mm.

Various values associated with the second example are listed in Table 2. It should be noted that in the second example, surface number 1 denotes the entrance pupil P. It also should be noted that surface distance d9 (i.e. the surface distance between surface number 9 and surface number 10) presented in connection with surface number 9, surface distance d14 (i.e. the surface distance between surface number 14 and surface number 15) presented in connection with surface number 14 and surface distance d19 (i.e. the surface distance between surface number 19 and surface number 20) presented in connection with surface number 19 vary with the zooming operation.

TABLE 2 f = 160-400
Fno = 10.0-25.0

| m | r | d | υ | nd |
|---|---|---|---|---|
| 1 | entrance pupil P | 150.0000 | | 1.000000 |
| 2 | 144.0410 | 5.0000 | 71.31 | 1.569070 |
| 3 | −75.9140 | 2.0000 | 35.19 | 1.749501 |
| 4 | −160.0000 | 5.0000 | | 1.000000 |
| 5 | ∞ | 20.0000 | 56.05 | 1.568829 |
| 6 | ∞ | 33.0000 | | 1.000000 |
| 7 | 93.8169 | 4.0000 | 47.23 | 1.670029 |
| 8 | −69.4133 | 3.0000 | 51.47 | 1.733997 |
| 9 | 73.5007 | d9 (variable) | | 1.000000 |
| 10 | −157.2904 | 4.5000 | 27.51 | 1.755199 |
| 11 | −21.7924 | 1.6000 | 55.53 | 1.696797 |
| 12 | 64.5076 | 2.0000 | | 1.000000 |
| 13 | −50.3485 | 1.6000 | 55.53 | 1.696797 |
| 14 | 308.8663 | d14 (variable) | | 1.000000 |
| 15 | −159.2190 | 4.5000 | 60.29 | 1.620411 |
| 16 | −49.5195 | 0.5000 | | 1.000000 |
| 17 | 71.2121 | 8.0000 | 71.31 | 1.569070 |
| 18 | −45.5487 | 3.0000 | 28.54 | 1.795040 |
| 19 | −388.5613 | d19 (variable) | | 1.000000 |
| 20 | 140.9733 | 6.0000 | 71.31 | 1.569070 |
| 21 | −99.0712 | 27.0000 | | 1.000000 |
| 22 | −58.3631 | 3.0000 | 64.10 | 1.516800 |
| 23 | −111.1167 | 105.3382 | | 1.000000 |

(Variable Distance Upon Magnification Variation)

| | lowest (1 pos) | intermediate (2 pos) | highest (3 pos) |
|---|---|---|---|
| f | 160.00000 | 250.00000 | 400.00000 |
| d9 | 7.99422 | 45.88377 | 70.94166 |
| d14 | 22.28842 | 16.18228 | 6.02350 |
| d19 | 50.69339 | 18.90998 | 4.01087 |

(Values corresponding to Conditions)

(1) β2H = −0.806
(2) 1/β3L = −0.009
(3) PL/fL = 0.938
(4) L1/f1 = 0.211

Figure 6:
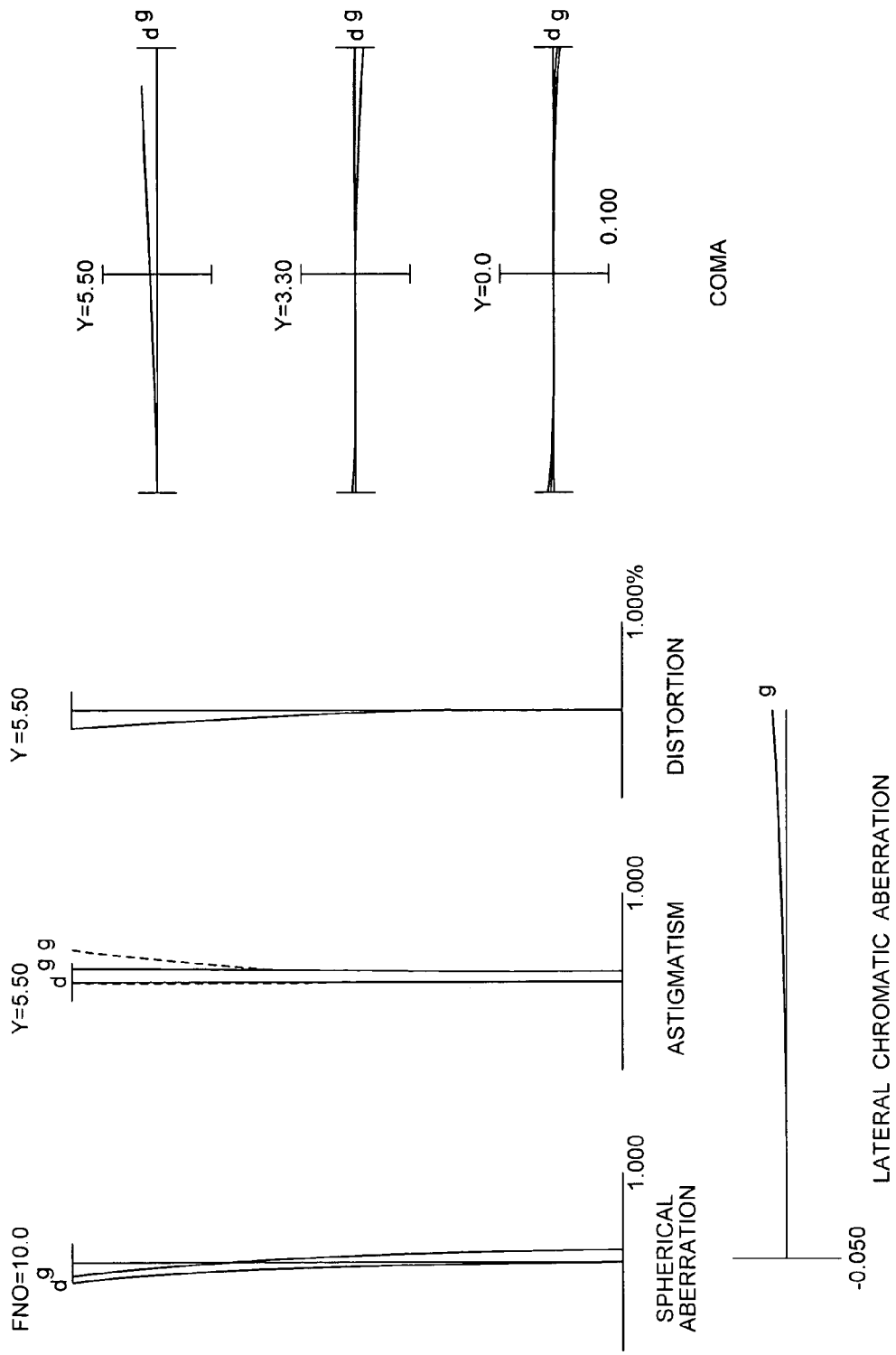
FIG. 6 shows aberrations of the second example at the lowest magnification (1pos).
Figure 7:
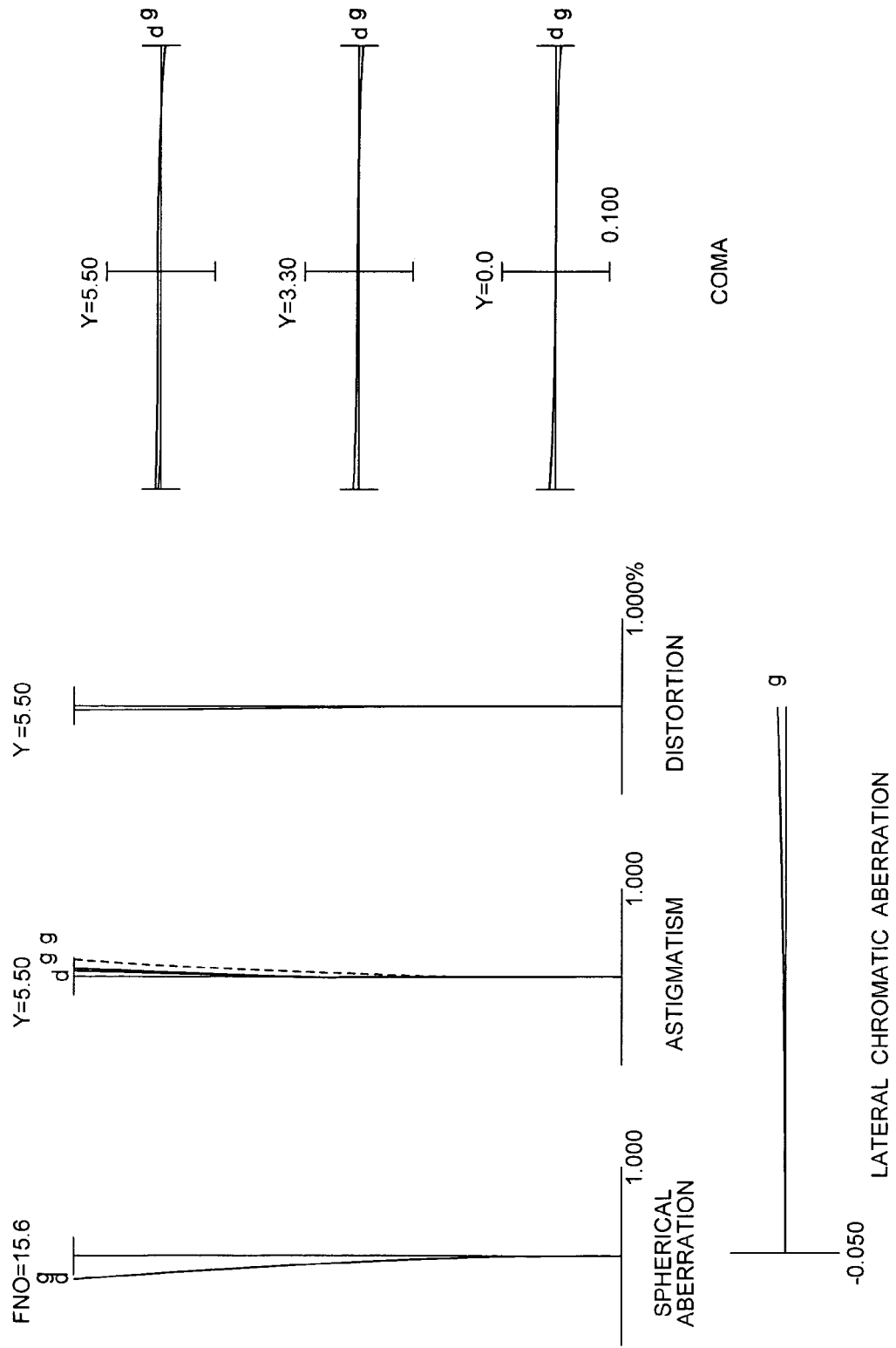
FIG. 7 shows aberrations of the second example at an intermediate magnification state (2pos).
Figure 8:
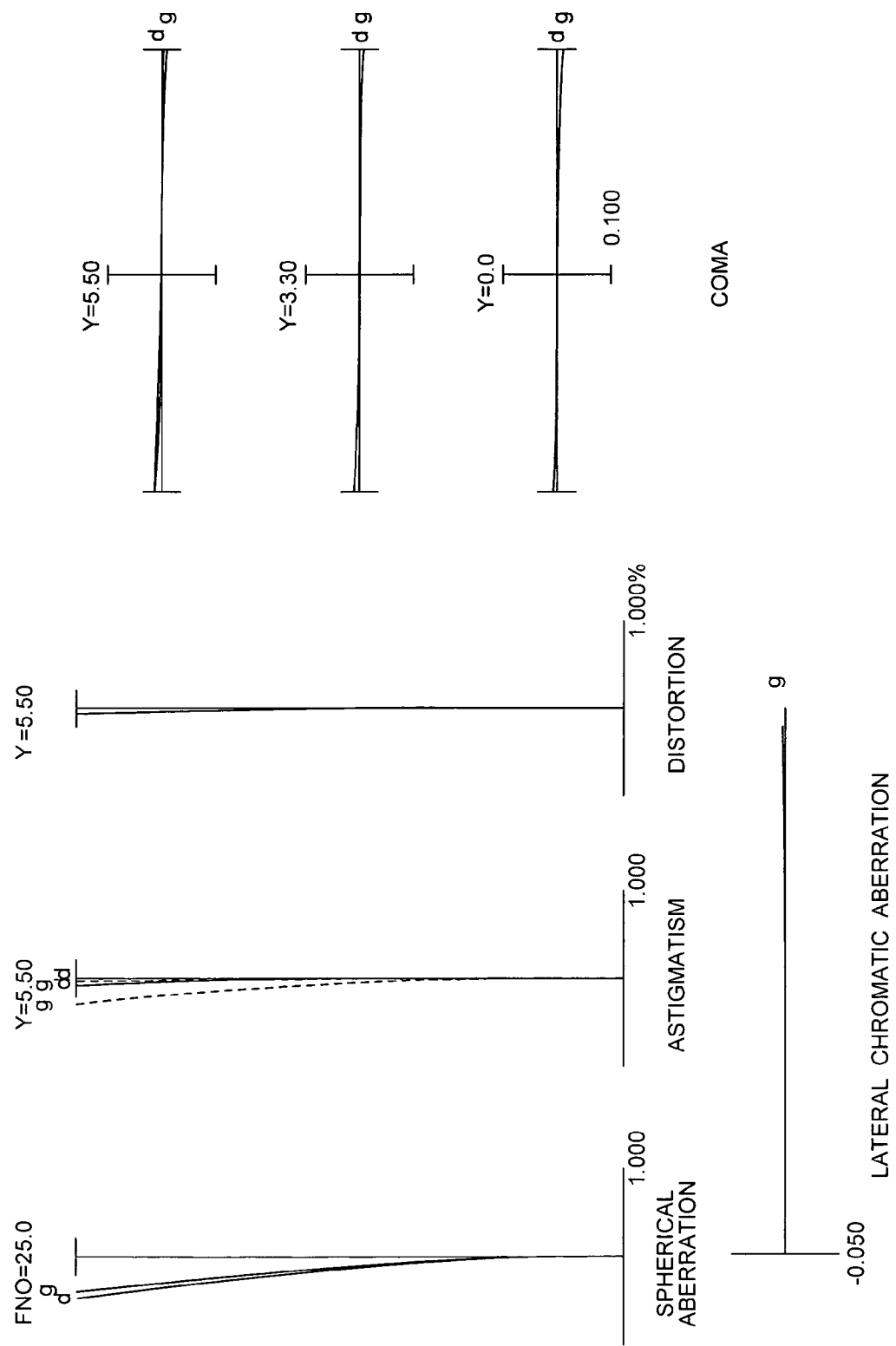
FIG. 8 shows aberrations of the second example at the highest magnification (3pos).

As per the above, the second example satisfies all of the aforementioned conditions (1) to (4). FIGS. 6 to 8 show spherical aberration, astigmatism, distortion, coma and lateral chromatic aberration of the second example. Specifically, FIG. 6 shows aberrations at the lowest magnification (f=160), FIG. 7 shows aberrations at the intermediate magnification state (f=250) and FIG. 8 shows aberrations at the highest magnification (f=400). As will be apparently appreciated from the aberration diagrams, in the second example, the aberrations are favorably corrected in each of the focal length states and excellent imaging performance is ensured.

Third Example

Figure 9:
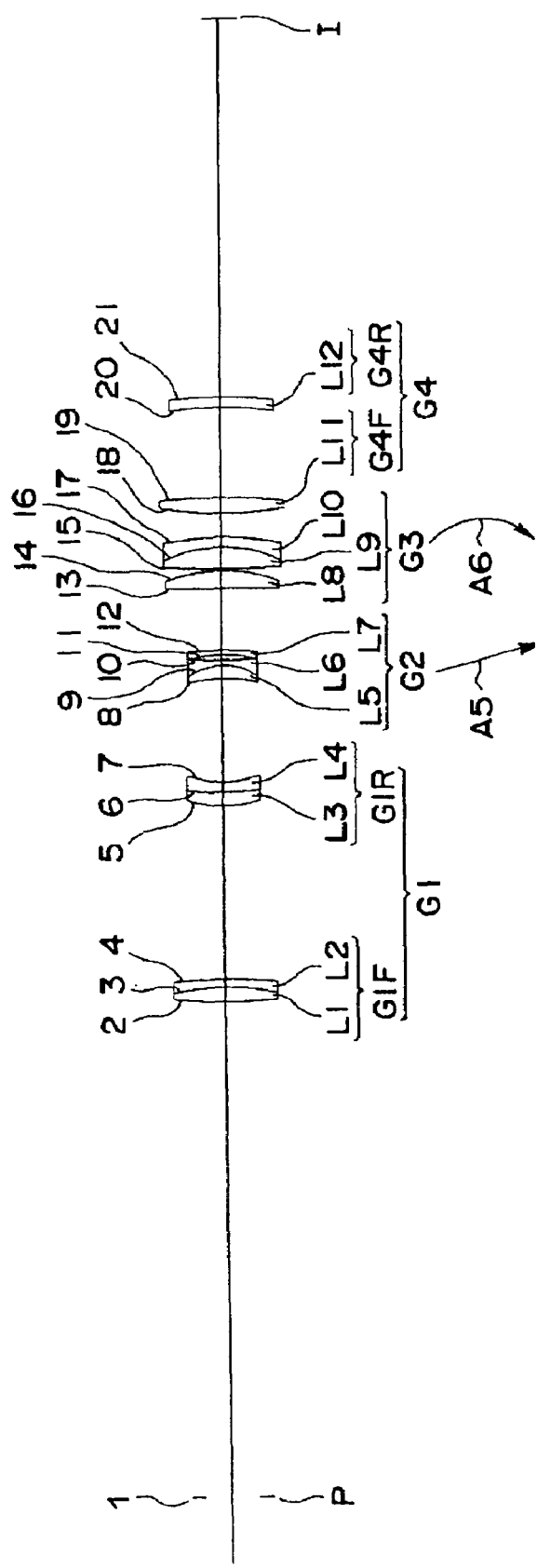
FIG. 9 is a diagram showing the lens configuration of a third example of a microscope zoom lens system according to the present invention.

Next, the third example of the present invention will be described with reference to FIGS. 9 to 12. FIG. 9 is a diagram showing the lens configuration of the third example of the microscope zoom lens system according to the present invention. In the third example of the microscope zoom lens system, the first lens group G1 includes, in the following order from the object side, a front first lens group G1F in the form of a cemented lens composed of a biconvex lens L1 and a negative meniscus lens L2 with the concave surface facing the object side and a rear first lens group G1R in the form of a cemented lens composed of a positive meniscus lens L3 with the convex surface facing the object side and a negative meniscus lens L4 with the convex surface facing the object side. The second lens group G2 includes, in the following order from the object side, a cemented lens composed of a positive meniscus lens L5 with the concave surface facing the object side and a biconcave lens L6, and a negative meniscus lens L7 with the concave surface facing the object side. The third lens group G3 includes, in the following order from the object side, a biconvex lens L8 and a cemented lens composed of a biconvex lens L9 and a negative meniscus lens L10 with the concave surface facing the object side. The fourth lens group G4 includes, in the following order from the object side, a front fourth lens group G4F in the form of a biconvex lens L11, and a rear fourth lens group G4R in the form of a negative meniscus lens L12 with the concave surface facing the object side.

In the present invention, when the magnification is varied from the lowest magnification (1pos) to the highest magnification (3pos) through an intermediate magnification state (2pos), the second lens group G2 is moved toward the image side (as shown by arrow A5). In addition, the third lens group G3 is moved (as shown by arrow A6) in such a way as to compensate displacement of the focal point caused by the movement of the second lens group. During the magnification changing process, both the first lens group G1 and the fourth lens group G4 are fixed relative to the image plane I.

The entrance pupil is arranged at a position spaced apart from the surface in the first lens group G1 that is closest to the object by 150 mm in the frontward direction. The diameter of the entrance pupil is φ16 mm.

Various values associated with the third example are listed in Table 2. It should be noted that in the third example, surface number 1 denotes the entrance pupil P. It also should be noted that surface distance d7 (i.e. the surface distance between surface number 7 and surface number 8) presented in connection with surface number 7, surface distance d12 (i.e. the surface distance between surface number 12 and surface number 13) presented in connection with surface number 12 and surface distance d17 (i.e. the surface distance between surface number 17 and surface number 18) presented in connection with surface number 17 vary with the zooming operation.

TABLE 3 f = 160-400
Fno = 10.0-25.0

| m | r | d | υ | nd |
|---|---|---|---|---|
| 1 | entrance pupil P | 150.0000 | | 1.000000 |
| 2 | 144.0410 | 4.5000 | 71.31 | 1.569070 |
| 3 | −75.6270 | 2.5000 | 35.34 | 1.749500 |
| 4 | −160.0210 | 53.0000 | | 1.000000 |
| 5 | 38.4880 | 4.0000 | 51.51 | 1.734000 |
| 6 | 110.9200 | 3.0000 | 47.25 | 1.670030 |
| 7 | 30.3200 | d7 (variable) | | 1.000000 |
| 8 | −54.2180 | 4.0000 | 23.78 | 1.846660 |
| 9 | −19.0995 | 1.6000 | 49.61 | 1.772500 |
| 10 | 100.0690 | 1.6000 | | 1.000000 |
| 11 | −42.8210 | 1.6000 | 49.61 | 1.772500 |
| 12 | −157.1661 | d12 (variable) | | 1.000000 |
| 13 | 6579.0000 | 5.5000 | 82.56 | 1.497820 |
| 14 | −47.9140 | 0.5000 | | 1.000000 |
| 15 | 336.8300 | 6.5000 | 82.56 | 1.497820 |
| 16 | −42.7990 | 3.0000 | 28.55 | 1.795040 |
| 17 | −93.2940 | d17 (variable) | | 1.000000 |
| 18 | 104.4820 | 5.0000 | 82.56 | 1.497820 |
| 19 | −196.4180 | 27.5000 | | 1.000000 |
| 20 | −104.4820 | 3.0000 | 64.12 | 1.516800 |
| 21 | −154.7100 | 113.1033 | | 1.000000 |

(Variable Distance Upon Magnification Variation)

| | lowest (1 pos) | intermediate (2 pos) | highest (3 pos) |
|---|---|---|---|
| f | 160.00000 | 250.00000 | 400.00000 |
| d7 | 7.93531 | 31.71283 | 47.12635 |
| d12 | 26.78329 | 18.89774 | 5.88585 |
| d17 | 23.30197 | 7.41000 | 5.00838 |

(Values corresponding to Conditions)

Figure 10:
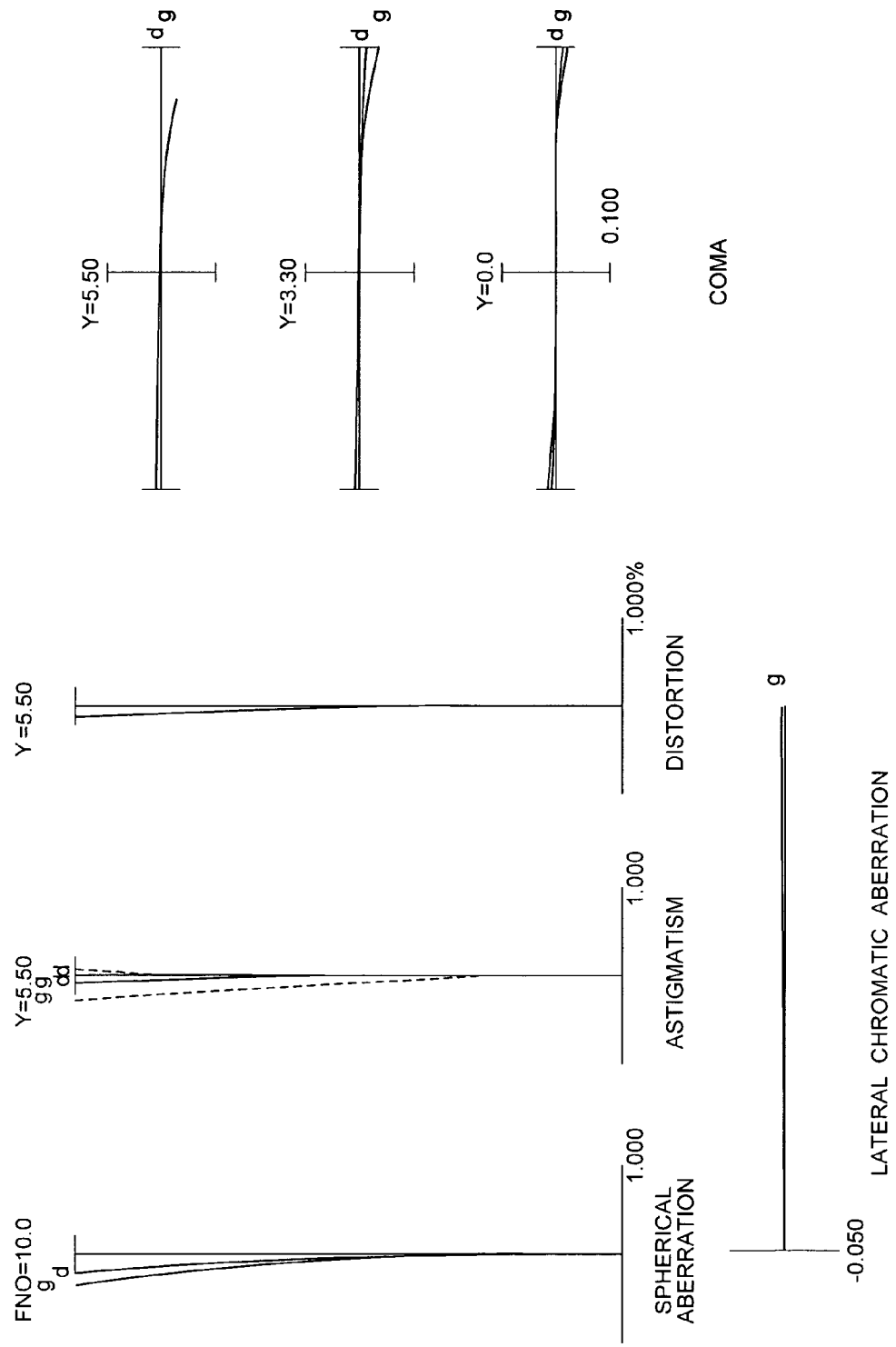
FIG. 10 shows aberrations of the third example at the lowest magnification (1pos).
Figure 11:
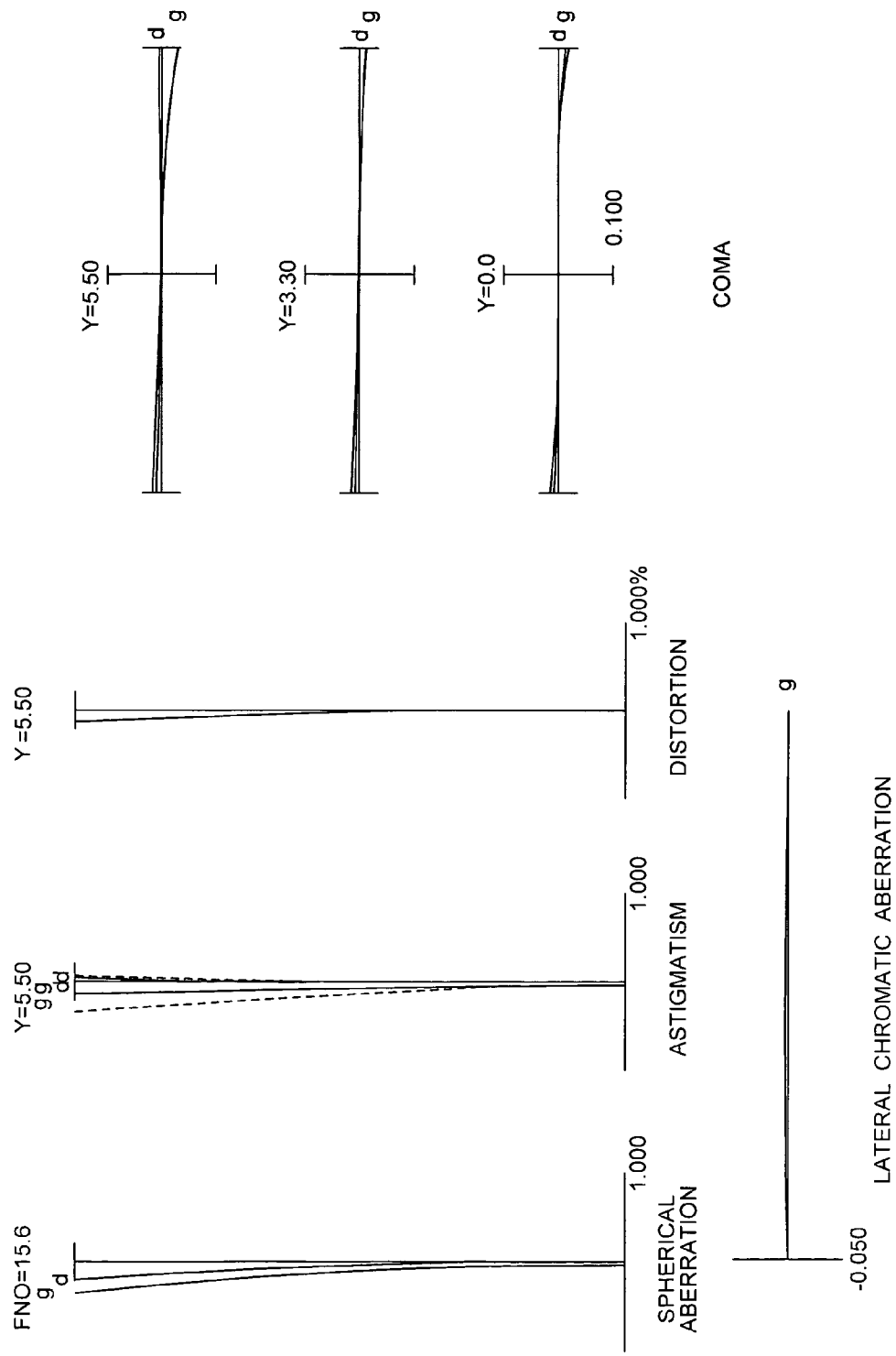
FIG. 11 shows aberrations of the third example at an intermediate magnification state (2pos).
Figure 12:
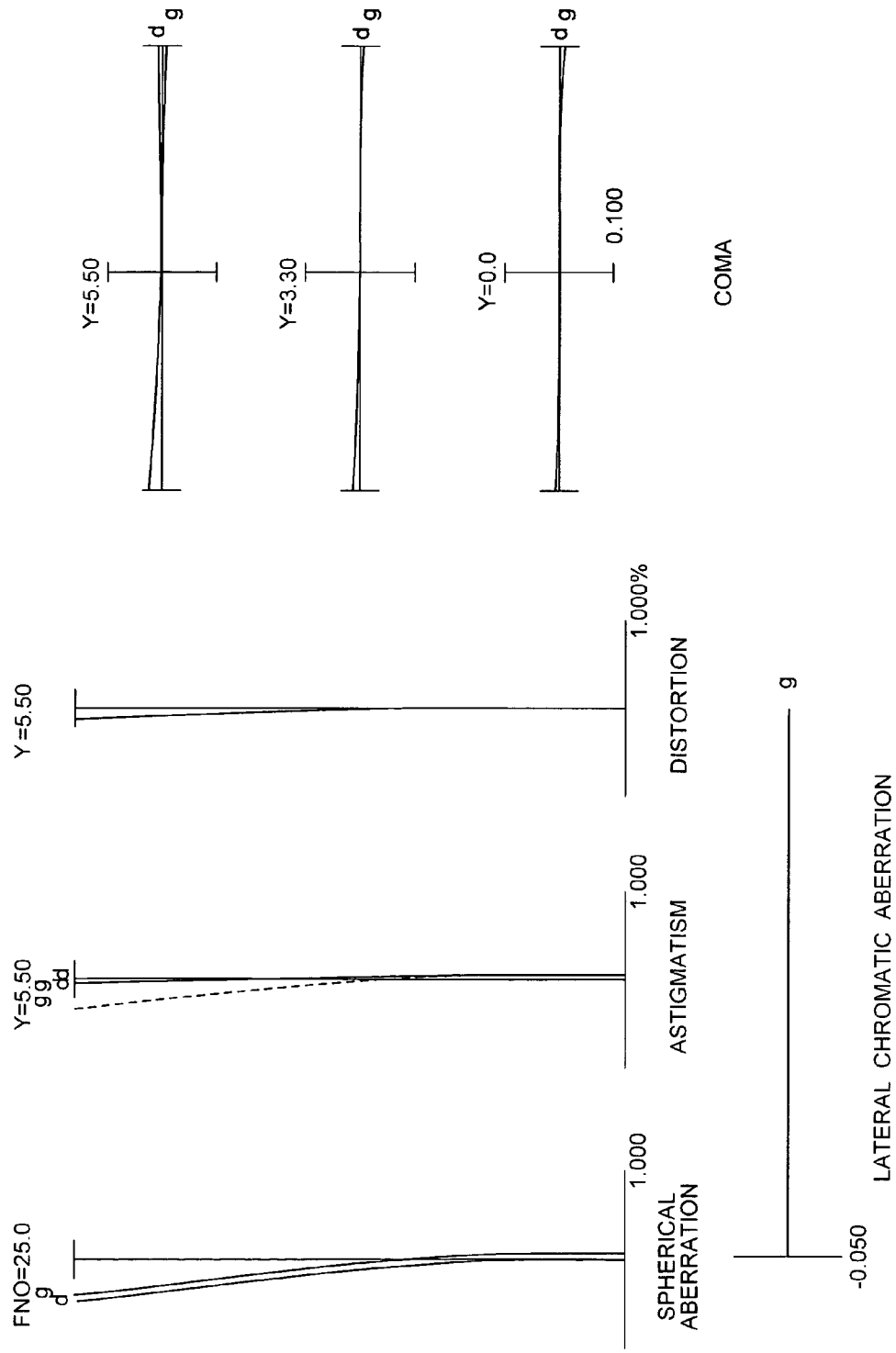
FIG. 12 shows aberrations of the third example at the highest magnification (3pos).

(1) $\beta 2H = -1.163$
(2) $1/\beta 3L = -0.053$
(3) $PL/fL = 0.938$
(4) $L1/f1 = 0.294$ As per the above, the third example satisfies all of the aforementioned conditions (1) to (4). FIGS. 10 to 12 show spherical aberration, astigmatism, distortion, coma and lateral chromatic aberration of the third example. Specifically, FIG. 10 shows aberrations at the lowest magnification (f=160), FIG. 11 shows aberrations at the intermediate magnification state (f=250) and FIG. 12 shows aberrations at the highest magnification (f=400). As will be apparently appreciated from the aberration diagrams, in the third example, the aberrations are favorably corrected in each of the focal length states and excellent imaging performance is ensured.

Fourth Example

Figure 13:
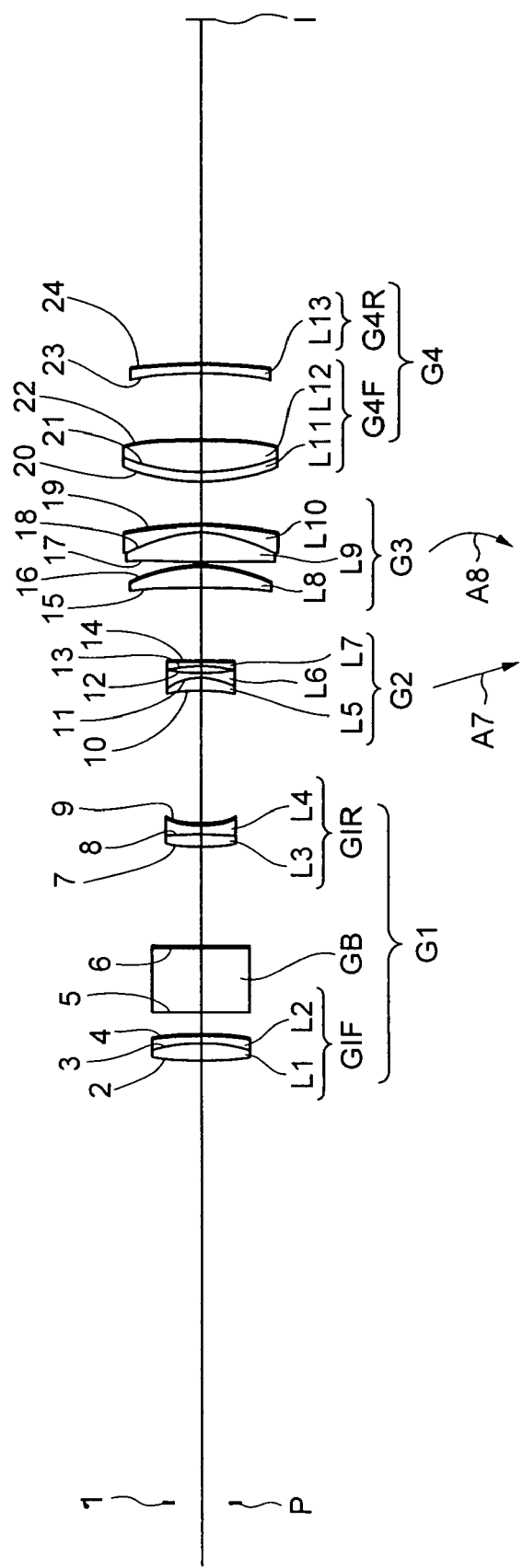
FIG. 13 is a diagram showing the lens configuration of a fourth example of a microscope zoom lens system according to the present invention.

In the following, the fourth example according to the present invention will be described with reference to FIGS. 13 to 16. FIG. 13 is a diagram showing the lens configuration of the fourth example of the microscope zoom lens system according to the present invention. In the fourth example of the microscope zoom lens system, the first lens group G1 includes, in the following order from the object side, a front first lens group G1F in the form of a cemented lens composed of a biconvex lens L1 and a negative meniscus lens L2 with the concave surface facing the object side, a glass block GB, and a rear first lens group G1R in the form of a cemented lens composed of a positive meniscus lens L3 with the convex surface facing the object side and a negative meniscus lens L4 with the convex surface facing the object side. The second lens group G2 includes, in the following order from the object side, a cemented lens composed of a positive meniscus lens L5 with the concave surface facing the object side and a biconcave lens L6, and a negative meniscus lens L7 with the concave surface facing the object side. The third lens group G3 includes, in the following order from the object side, a positive meniscus lens L8 with the concave surface facing the object side and a cemented lens composed of a biconvex lens L9 and a negative meniscus lens L10 with the concave surface facing the object side. The fourth lens group G4 includes, in the following order from the object side, a front fourth lens group G4F in the form of a cemented lens composed of a negative meniscus lens L11 with the convex surface facing the object side and a biconvex lens 12 and a rear fourth lens group G4R in the form of a negative meniscus lens L13 with the concave surface facing the object side.

In the present invention, when the magnification is varied from the lowest magnification (1pos) to the highest magnification (3pos) through an intermediate magnification state (2pos), the second lens group G2 is moved toward the image side (as shown by arrow A7). In addition, the third lens group G3 is moved (as shown by arrow A8) in such a way as to compensate displacement of the focal point caused by the movement of the second lens group. During the magnification changing process, both the first lens group G1 and the fourth lens group G4 are fixed relative to the image plane I.

The entrance pupil is arranged at a position spaced apart from the surface in the first lens group G1 that is closest to the object by 130 mm in the frontward direction. The diameter of the entrance pupil is φ16 mm.

Various values associated with the fourth example are listed in Table 4. It should be noted that in the fourth example, surface number 1 denotes the entrance pupil P. It also should be noted that surface distance d9 (i.e. the surface distance between surface number 9 and surface number 10) presented in connection with surface number 9, surface distance d14 (i.e. the surface distance between surface number 14 and surface number 15) presented in connection with surface number 14 and surface distance d19 (i.e. the surface distance between surface number 19 and surface number 20) presented in connection with surface number 19 vary with the zooming operation.

TABLE 4 f = 120-360
Fno = 7.5-22.5

| m | r | d | υ | nd |
|---|---|---|---|---|
| 1 | entrance pupil P | 130.0000 | | 1.000000 |
| 2 | 144.0000 | 5.0000 | 71.31 | 1.569070 |
| 3 | −75.9120 | 2.0000 | 35.19 | 1.749501 |
| 4 | −160.0000 | 6.0000 | | 1.000000 |
| 5 | ∞ | 20.0000 | 56.05 | 1.568829 |
| 6 | ∞ | 30.0000 | | 1.000000 |
| 7 | 32.8011 | 4.0000 | 50.84 | 1.658440 |
| 8 | 2823.9336 | 2.0000 | 49.45 | 1.772789 |
| 9 | 32.2030 | d9 (variable) | | 1.000000 |
| 10 | −77.8803 | 5.2000 | 23.78 | 1.846660 |
| 11 | −17.9764 | 1.6000 | 45.37 | 1.796681 |
| 12 | 80.2323 | 2.1000 | | 1.000000 |
| 13 | −47.2366 | 2.0000 | 45.37 | 1.796681 |
| 14 | −1191.1632 | d14 (variable) | | 1.000000 |
| 15 | −386.3066 | 7.3000 | 82.52 | 1.497820 |

TABLE 4-continued f = 120-360
Fno = 7.5-22.5

| 16 | −42.6991 | 0.5000 | | 1.000000 |
| 17 | 472.1876 | 9.5000 | 82.52 | 1.497820 |
| 18 | −39.9454 | 3.0000 | 28.56 | 1.795040 |
| 19 | −82.0341 | d19 (variable) | | 1.000000 |
| 20 | 66.3259 | 3.0000 | 47.47 | 1.787971 |
| 21 | 57.5381 | 9.2000 | 82.52 | 1.497820 |
| 22 | −217.8017 | 20.0000 | | 1.000000 |
| 23 | −131.5573 | 3.0000 | | 1.620409 |
| 24 | −259.2192 | 94.9469 | | 1.000000 |

(Variable Distance Upon Magnification Variation)

| | lowest (1 pos) | intermediate (2 pos) | highest (3 pos) |
| --- | --- | --- | --- |
| f | 120.00000 | 200.00000 | 360.00000 |
| d9 | 8.28583 | 39.33951 | 59.60475 |
| d14 | 27.00298 | 20.02267 | 6.14533 |
| d19 | 34.93334 | 10.85997 | 4.47207 |

(Values corresponding to Conditions)

(1) β2H = −1.112
(2) 1/β3L = −0.031
(3) PL/fL = 1.083
(4) L1/f1 = 0.257

Figure 14:
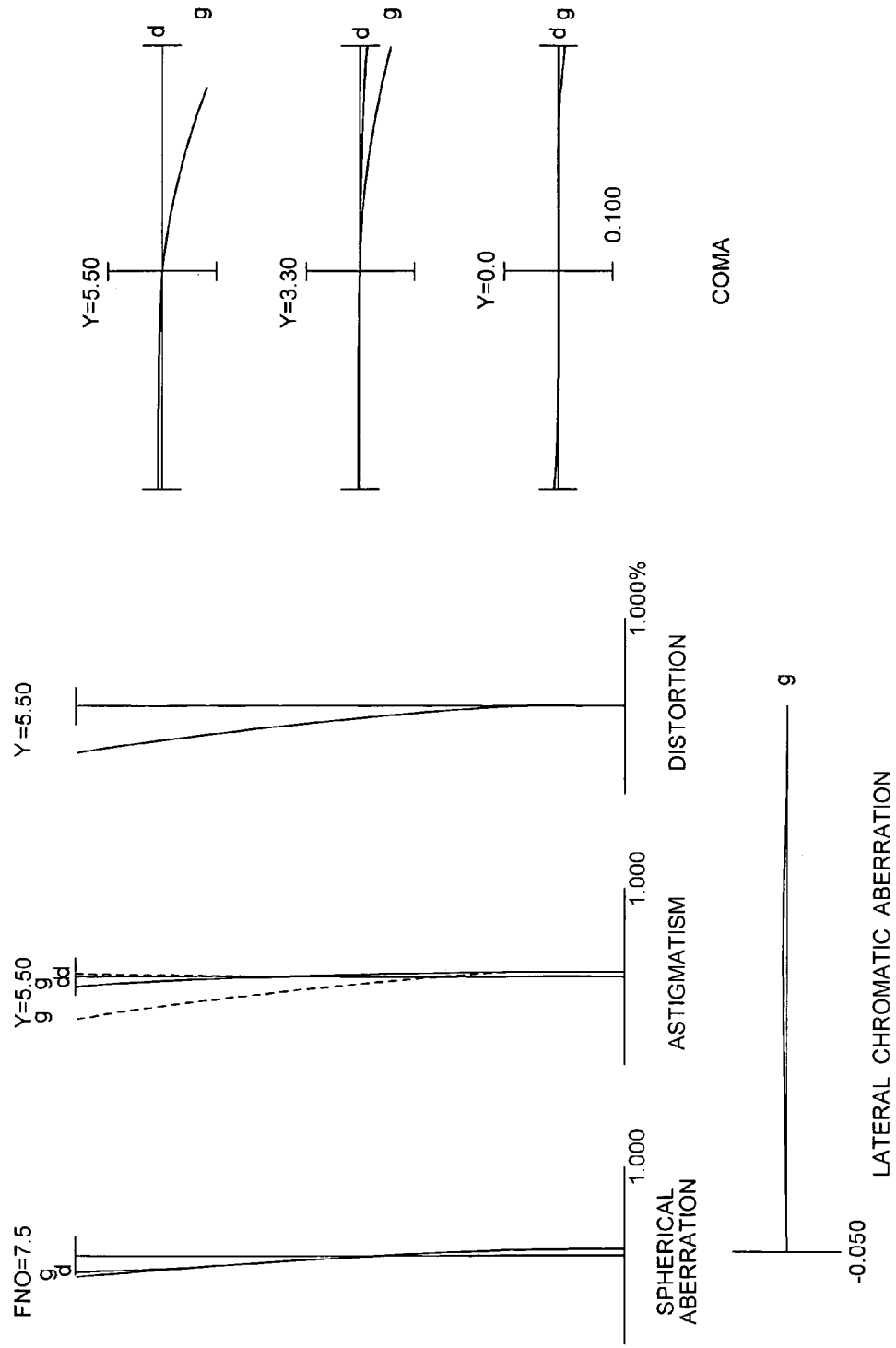
FIG. 14 shows aberrations of the fourth example at the lowest magnification (1pos).
Figure 15:
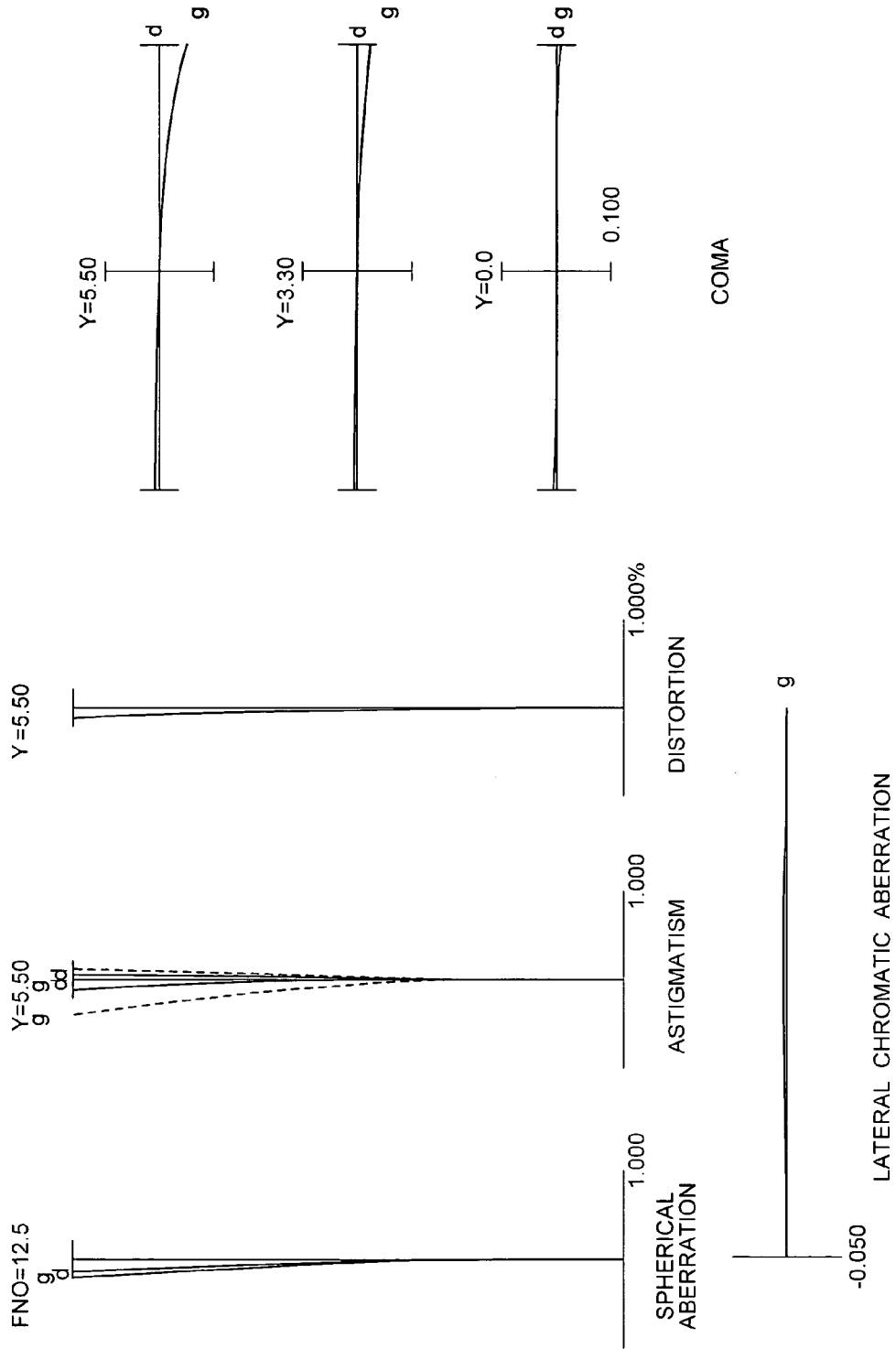
FIG. 15 shows aberrations of the fourth example at an intermediate magnification state (2pos).
Figure 16:
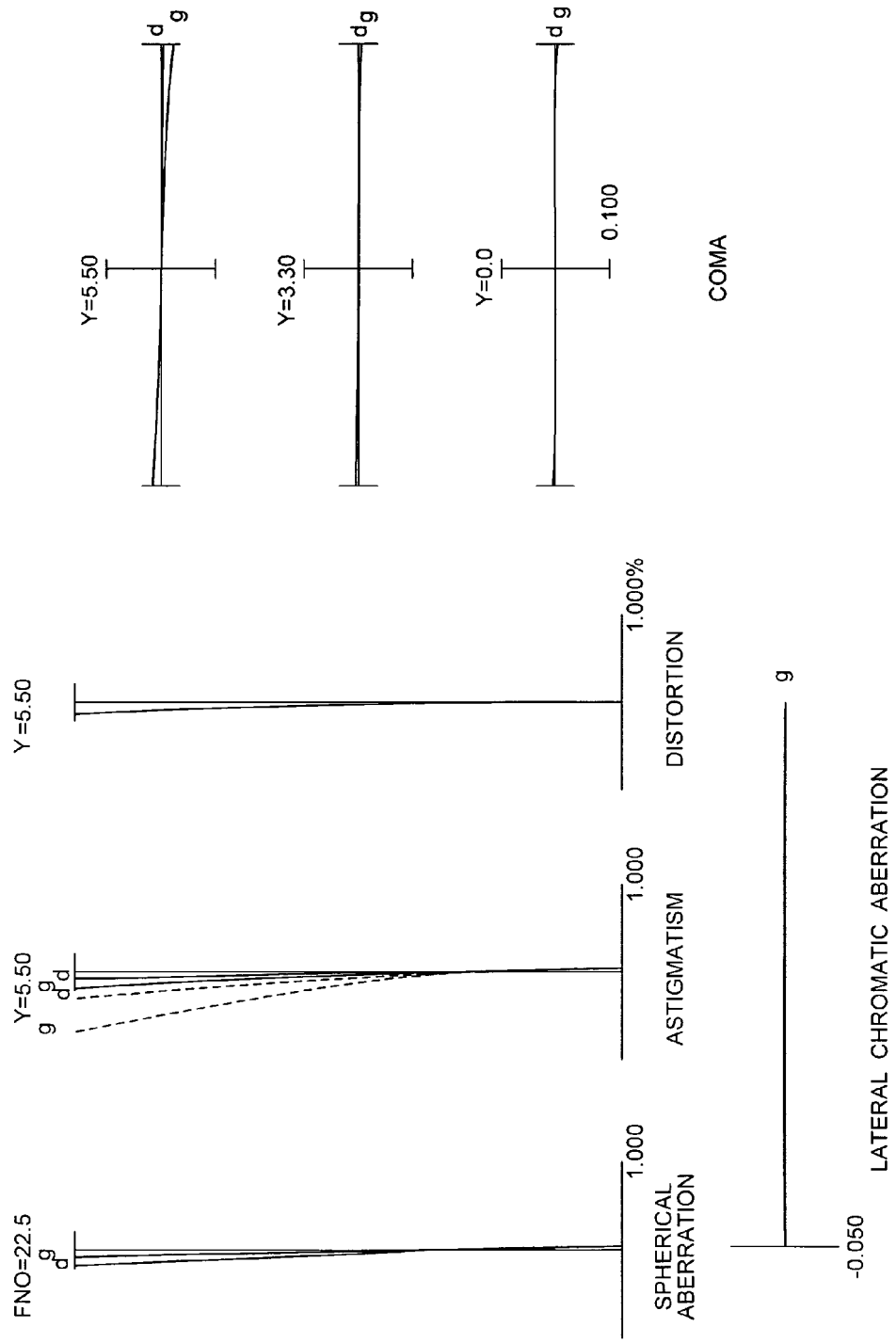
FIG. 16 shows aberrations of the fourth example at the highest magnification (3pos).

As per the above, the fourth example satisfies all of the aforementioned conditions (1) to (4). FIGS. 14 to 16 show spherical aberration, astigmatism, distortion, coma and lateral chromatic aberration of the fourth example. Specifically, FIG. 14 shows aberrations at the lowest magnification (f=120), FIG. 15 shows aberrations at the intermediate magnification state (f=200) and FIG. 16 shows aberrations at the highest magnification (f=360). As will be apparently appreciated from the aberration diagrams, in the fourth example, the aberrations are favorably corrected in each of the focal length states and excellent imaging performance is ensured.

Fifth Example

Figure 17:
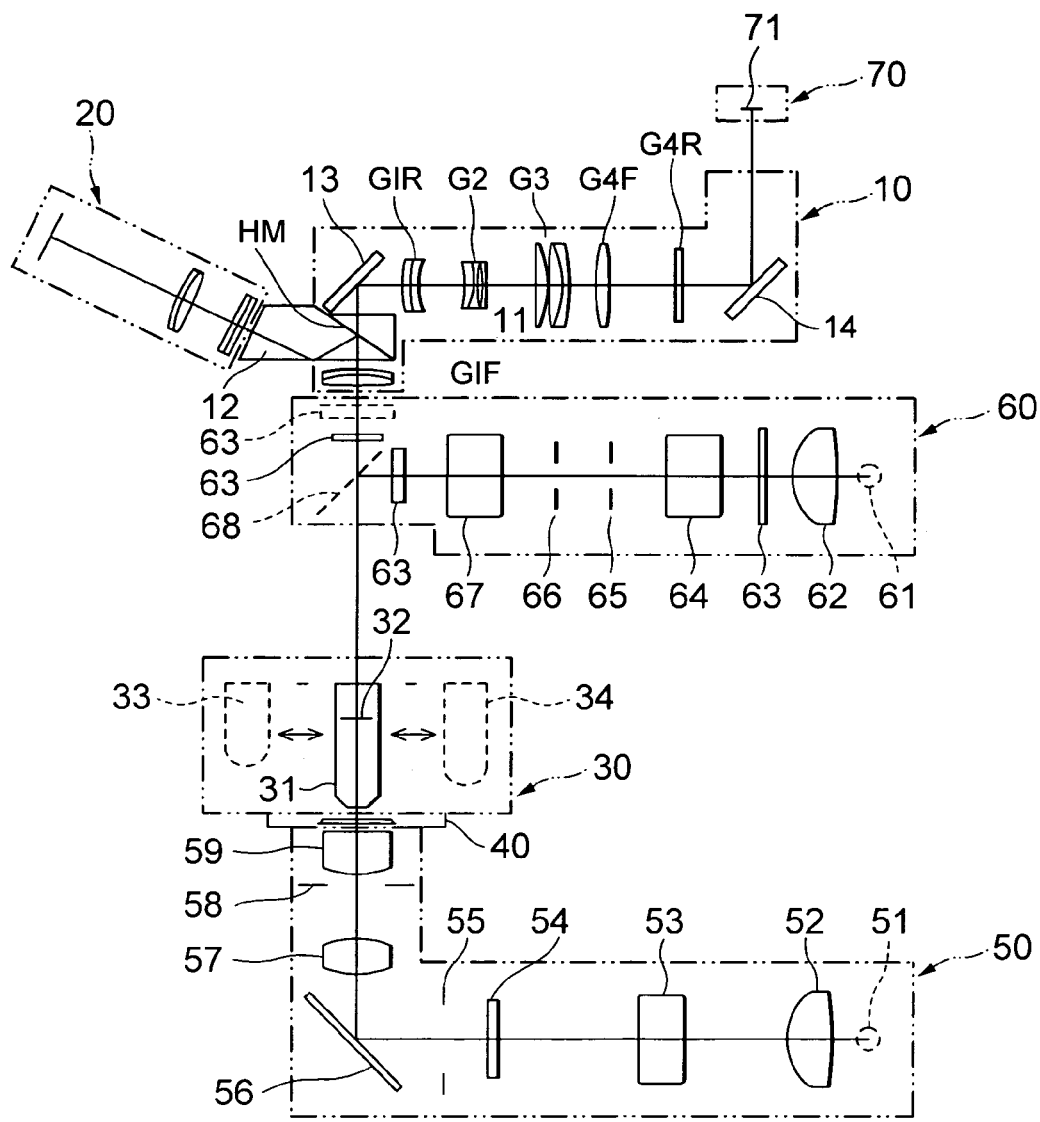
FIG. 17 is diagram schematically showing the structure of a fifth example in the form of a microscope equipped with a microscope zoom lens system according to the present invention.

Firstly, a description will be made of a case in which transmitted illumination is used in the microscope according to the present invention. As shown in FIG. 17, light from a light source 51 in the transmitted illumination optical system 50 travels through a collector lens 52, relay lenses 53 and 54, a field stop 55, a mirror 56 and a relay lens 57 to form an image of the light source 51 on an aperture stop 58. Then, the light illuminates a specimen on a stage 40 as a parallel light flux through a condenser lens 59.

The light emitted from the illuminated specimen forms an image of the light source 51 formed on the aperture stop 58 on an exit pupil 32. Then, the light is converted into a parallel light flux by an objective lens 31 to travel further, and split by a half mirror HM on the joining surface of optical path separating optical elements 11 and 12 disposed between the front first lens group G1F and the rear first lens group G1R in the microscope zoom lens system 10 according to the present invention. One half of the split light travels toward a visual observation optical system 20 for visual observation using an eyepiece lens (not shown). The other half of split light travels toward the optical system of the microscope zoom lens system 10. Specifically, the light travels through a deflecting mirror 13, the first rear lens group G1R, the second lens group G2, the third lens group G3, the front fourth lens group G4F, the rear fourth lens group G4R 14 and a deflecting mirror 14 so as to be focused on a solid state image pickup element 71 provided in a solid state image pickup apparatus 70 so that an electronic image of the specimen can be obtained.

In the microscope zoom lens system 10, the magnification of electronic images obtained by the solid state image pickup apparatus 70 can be freely changed by changing the configuration of the optical system.

It is possible to guide all of the light fluxes to the visual observation optical system 20 by replacing the half mirror HM provided on the joining surface of the optical path separating optical elements 11 and 12 by a prism having an ordinary mirror. It is also possible to guide all of the light fluxes to the microscope zoom lens system 10 by replacing the optical path separating elements 11 and 12 by a glass block.

In the objective lens changing unit 30, objective lenses 33 and 34 (different from the objective lens 31) are interchangeably provided in addition to the objective lens 31. Each of the objective lenses 31, 33, 34 is arranged in such a way that its exit pupil is in the vicinity of (or at the position same as) the entrance pupil of the microscope zoom lens system 10.

In the case that epi-illumination is used in the microscope according to the present invention, light from a light source 61 in an epi-illumination optical system 60 travels through a collector lens 62, a filter 63 and a relay lens 64 to form an image of the light source 61 on an aperture stop 65. Then, the light travels through a field stop 66 and the image of the light source 61 is relayed onto the exit pupil 32 of the objective lens 31 via a relay lens 67, a filter 63 and a mirror 68 to illuminate a specimen on the stage 40 as a parallel light flux through the objective lens 31. The light emitted from the specimen thus illuminated travels in the same manner as in the case of the above-described transmitted illumination, and therefore the description thereof will be omitted.

The filter 63 is, specifically, an ND filter or a filter for heat absorption, fluorescence excitation or fluorescence absorption etc. In the case of ordinary epi-illumination, a half mirror is used as the mirror 68. In the case of fluorescent epi-illumination, a dichroic mirror is used as the mirror 68. The mirror 68 is adapted in such a way that it is retracted when transmitted illumination is used.

The present invention is not restricted to the above-described embodiments and it is apparent that various structures can be realized without departing from the scope of the present invention.

As per the above, the present invention can provide a microscope zoom lens system that is compact in size and having excellent optical performance. In addition, the present invention can provide a microscope equipped with a microscope zoom lens system in which visual observation using an eyepiece lens and observation or image pickup through an electronic image using the microscope zoom lens system can be easily changed over.

What is claimed is:

1. A zoom lens system for a microscope comprising, in the following order from the object side:
   a first lens group having a positive refractive power;
   a second lens group having a negative refractive power;
   a third lens group having a positive refractive power; and
   a fourth lens group having a positive refractive power,
   wherein magnification of the zoom lens system is varied
      by moving said second lens group and said third lens
      group, said zoom lens system has an entrance pupil on the object side of said first lens group, and the following conditions are satisfied:

$$-1.3 < \beta 2H < -0.7$$

$$-0.1 < 1/\beta 3L < 0$$

where β2H is the magnification of said second lens group in the highest magnification state, and β3L is the magnification of said third lens group in the lowest magnification state.

2. The zoom lens system for an microscope according to claim 1, wherein the following condition is satisfied:

$$0.5 < PL/fL < 1.2$$

where PL is the distance between the position of said entrance pupil and the object side surface of said first lens group G1, and fL is the focal length of the zoom lens system for a microscope as a whole in the lowest magnification state.

3. The zoom lens system for a microscope according to claim 2, wherein said first lens group includes a front lens group having a positive refractive power and a rear lens group having a weak negative refractive power, said front lens group and said rear lens group being spaced apart by a long lens distance, and the following condition is satisfied:

$$0.15 < L1/f1 < 0.35$$

where f1 is the focal length of said first lens group, and L1 is said lens distance, which is an optical path length, between the front lens group G1F and the rear lens group G1R.

4. A microscope comprising, in the following order from the object side:

an objective lens system;

a zoom lens system for a microscope according to claim 2; and an image pickup device, wherein the position of an exit pupil of said objective lens system is arranged at a position same as or in the vicinity of the position of the entrance pupil of said zoom lens system for a microscope.

5. A microscope comprising, in the following order from the object side:

an objective lens system;

a zoom lens system for a microscope according to claim 2; and an image pickup device, wherein an optical path separating device which separates an optical path of said zoom lens system for a microscope and an optical path of an optical system for visual observation is provided in said long lens distance between said front lens group and said rear lens group.

6. The zoom lens system for a microscope according to claim 1, wherein said first lens group includes a front lens group having a positive refractive power and a rear lens group having a weak negative refractive power, said front lens group and said rear lens group being spaced apart by a long lens distance, and the following condition is satisfied:

$$0.15 < L1/f1 < 0.35$$

where f1 is the focal length of said first lens group, and L1 is said lens distance, which is an optical path length, between the front lens group G1F and the rear lens group G1R.

7. A microscope comprising, in the following order from the object side:

an objective lens system;

a zoom lens system for a microscope according to claim 6; and an image pickup device, wherein the position of an exit pupil of said objective lens system is arranged at a position same as or in the vicinity of the position of the entrance pupil of said zoom lens system for a microscope.

8. A microscope comprising, in the following order from the object side:

an objective lens system;

a zoom lens system for a microscope according to claim 6; and an image pickup device, wherein an optical path separating device which separates an optical path of said zoom lens system for a microscope and an optical path of an optical system for visual observation is provided in said long lens distance between said front lens group and said rear lens group.

9. A microscope comprising, in the following order from the object side:

an objective lens system;

a zoom lens system for a microscope according to claim 1; and an image pickup device, wherein the position of an exit pupil of said objective lens system is arranged at a position same as or in the vicinity of the position of the entrance pupil of said zoom lens system for a microscope.

10. A microscope comprising, in the following order from the object side:

an objective lens system;

a zoom lens system for a microscope according to claim 1; and an image pickup device, wherein said first lens group includes a front lens group having a positive refractive power and a rear lens group having a weak negative refractive power, said front lens group and said rear lens group being spaced by a long lens distance, wherein an optical path separating device which separates an optical path of said zoom lens system for a microscope and an optical path of an optical system for visual observation is provided in said long lens distance between said front lens group and said rear lens group.

* * * * *